Feb. 2, 1954     C. B. DE VLIEG     2,667,819
POWER LOCK FOR TOOLS AND THE LIKE
Filed Sept. 10, 1949     3 Sheets-Sheet 1

INVENTOR.
Charles B. De Vlieg
BY
McCanna & Morsbach
Attys.

Feb. 2, 1954
C. B. DE VLIEG
2,667,819
POWER LOCK FOR TOOLS AND THE LIKE
Filed Sept. 10, 1949
3 Sheets-Sheet 2
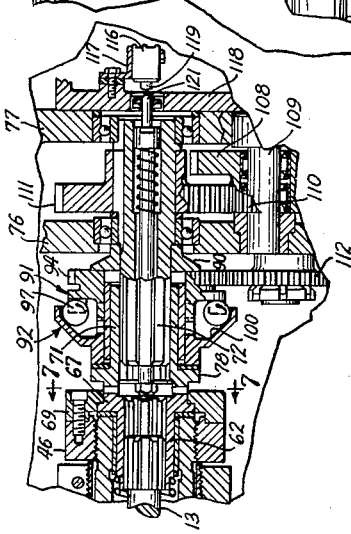
INVENTOR.
Charles B. De Vlieg
BY
McCanna & Morsbach
Attys.

Feb. 2, 1954 C. B. DE VLIEG 2,667,819
POWER LOCK FOR TOOLS AND THE LIKE
Filed Sept. 10, 1949 3 Sheets-Sheet 3
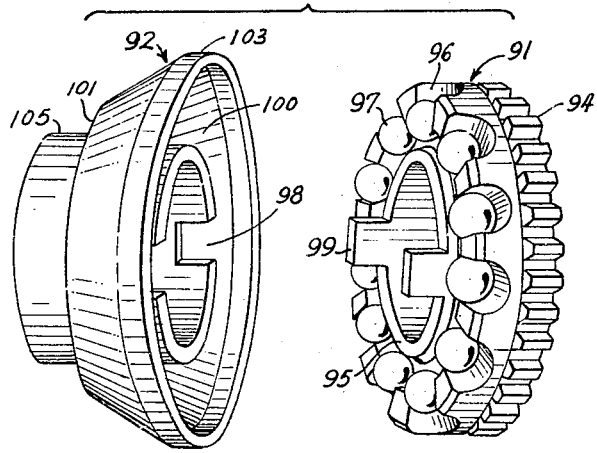
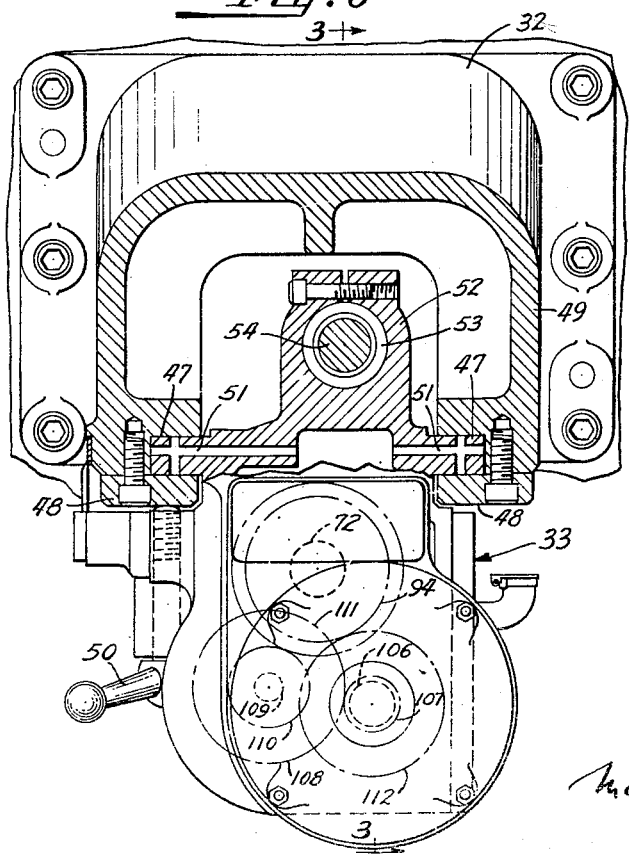
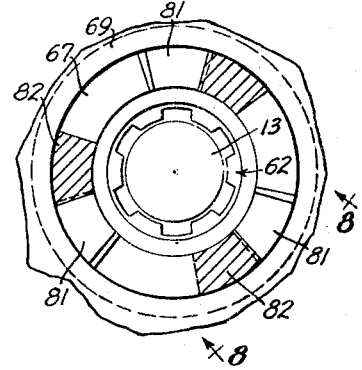
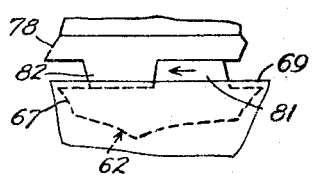
INVENTOR
Charles B. De Vlieg
BY
McKenna & Morebach
Attys Patented Feb. 2, 1954

2,667,819

UNITED STATES PATENT OFFICE 2,667,819

POWER LOCK FOR TOOLS AND THE LIKE

Charles B. De Vlieg, Farmington, Mich.

Application September 10, 1949, Serial No. 115,120

11 Claims. (Cl. 90—11)

This invention relates to mechanisms for locking in a tool spindle or the like, and releasing therefrom, a tool element or the like such as an arbor, a tool chuck, a boring bar, a tool adaptor, or any means for carrying a tool for boring, milling, turning, drilling or other metal cutting or treating means. While my invention is adapted particularly for machine tools, it has other applications.

Heretofore it has been customary in the machine tool industry when an operator sets up a machine to manually position the selected tool with respect to the spindle so that the shank of the tool is received in the tool receiving recess or socket of the machine spindle. In some instances as when the spindle socket and the tool shank each have the well known Morse taper no special means are used for holding the tool in the spindle other than forcibly seating the tool shank in the spindle socket. This requires a manual act of force which may vary considerably in degree according to individual operators and circumstances. If driven in with too much force the tool is apt to become wedged in the socket to such a degree that considerable force is required to drive it out by means of the usual drift pin and hammer blows. When a machine is new the spindle may be spread by such overly forceful driving of the tool into the spindle socket and by driving it out, resulting in enlargement or deformation of the outside diameter of the spindle. This causes the spindle to bind and sometimes jam in its bearing. It may also cause misalignment of the spindle and impair the accuracy and life of the machine. In other instances a draw bolt is used, threaded at one end into the tool and pulled home by manually turning the bolt with a wrench applied to the opposite end. This also involves variables in the acts of force or violence in driving the tool in and out. In other instances pressure fluid operated means have been provided for locking the tool in the tool socket. In general these prior expedients have not been entirely satisfactory. Considerable difficulty is frequently encountered when it is desired to remove the tool from the spindle. Very frequently the tool is wedged so tightly into the tool receiving socket that it cannot be readily manually removed. In most cases hammer blows have to be administered to the side of the spindle to effect loosening of the tool so that the latter can be removed from the spindle. The use of a hammer for removing a tool is objectionable because the spindle is subject to damage and mutilation which in turn might cause misalignment of the tool. Also, accidents to operating personnel are possible, such as by being hit by the hammer should it glance from the side of the spindle. Too, in some instances, where the tool tends to stick, a considerable amount of time is required by the operator to effect a change of tools.

My invention has for its main object the provision of a tool locking and releasing mechanism having a novel principle of operation whereby the objections to prior mechanisms are overcome and new and beneficial results are obtained.

One phase of my invention contemplates the use of coacting tool and spindle tapers of considerably higher angular taper than the abovementioned Morse taper in combination with novel mechanism operating in response to finger touch of the operator to automatically effect locking of the tool in the spindle and by similar finger touch to effect release of the tool.

Another object of my invention is to provide mechanism of the character described having such novel construction and function as to effect said automatic locking of the tool to a predetermined degree of uniformity and precision.

Another object of my invention is to provide a tool locking mechanism which will effect automatic locking of the tool in response to a control function in a comparatively short period of time such as one and one half second and less than one second, fully elapsed time, depending on the gearing or gear ratio employed.

An object of this invention is to provide a novel cutter tool locking mechanism of the above character that permits a change of tools in a minimum of time.

Another object of the invention is the provision of an improved tool locking mechanism that eliminates the necessity of utilizing a hammer to pound the spindle to loosen the tool.

Another object of the invention is to provide an improved tool locking mechanism that insures uniformity of locking pressure for all tools received in the tool receiving socket in the spindle.

Another object of the invention is the provision of an improved tool locking mechanism that requires a minimum of manual effort to effect a change of tools.

Another object of the invention is to provide an improved tool locking mechanism for securing a tool in a spindle that minimizes tool vibration and insures a smooth finish on a workpiece.

Another object of the invention is to provide an improved tool locking mechanism that is positive in its operation, that is simple, and that is relatively inexpensive to manufacture.

Other objects and advantages of the invention will become apparent from the following detailed description taken in connection with the accompanying drawings, in which—

Figure 2 is a fragmentary sectional view of the spindle taken along its longitudinal axis to show the relation of the parts therein when the tool is initially inserted in the tool socket;

Figure 3 is an enlarged fragmentary elevational view of the spindle head with portions removed to show details of construction of the tool locking mechanism and showing the components of a clutch mechanism in a retracted position;

Figure 4 is a fragmentary view similar to Figure 3 showing the components of the clutch mechanism in an engaged position;

Figure 5 is a perspective view of the speed responsive mechanism in a disassembled position;

Figure 6 is a fragmentary end view of the tool locking mechanism with portions of the spindle head cut away to show the details of construction of a slide for the spindle and tool locking mechanism;

Figure 7 is a transverse sectional view taken substantially along the line 7—7 of Figure 4, showing the clutch teeth in the unlocking contact; and Figure 8 is an elevational view taken substantially along the lines 8—8 of Figure 7.

Figure 1:
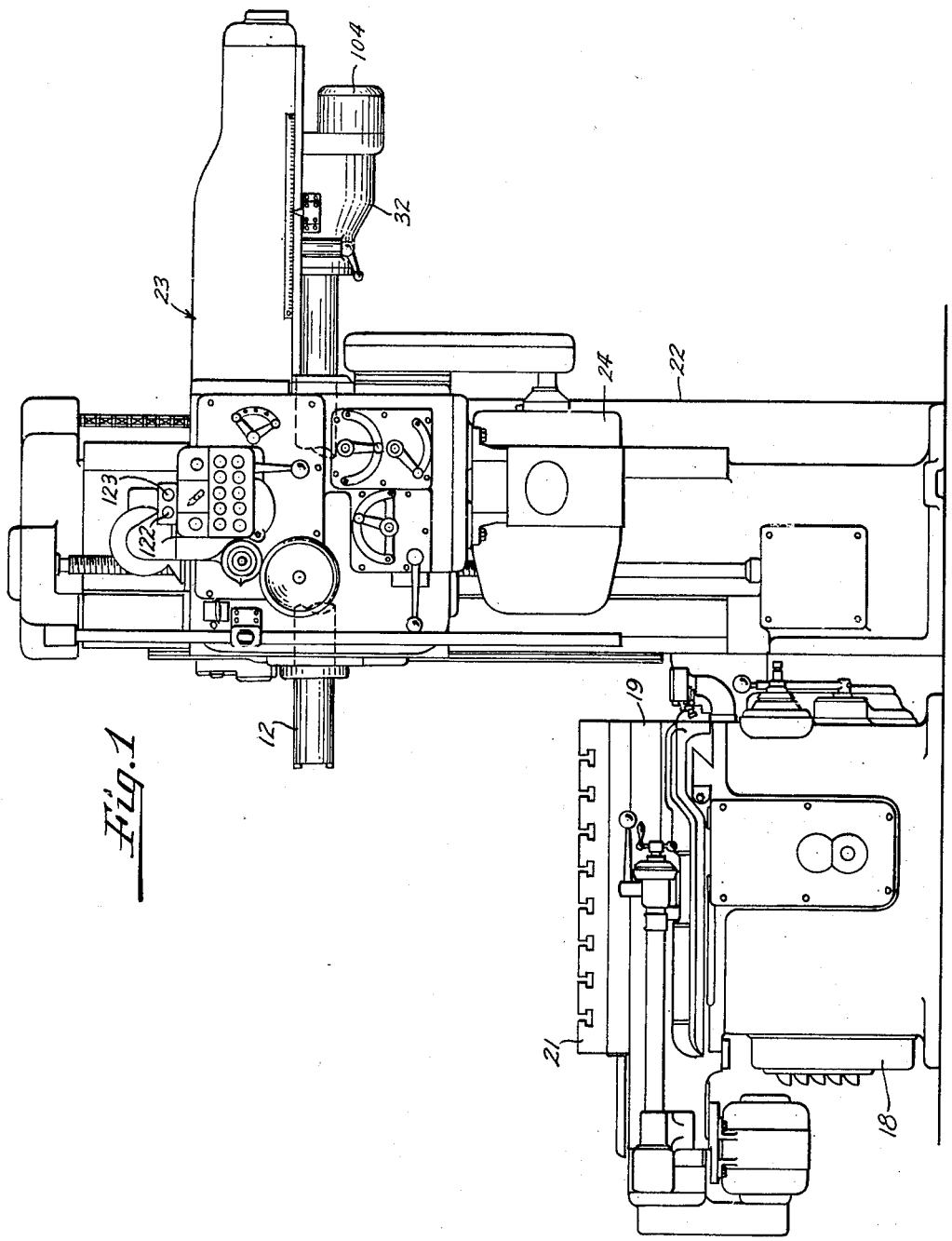
Figure 1 is a side elevation of a machine tool embodying the present invention.

For purposes of illustrating the invention the tool locking mechanism is shown embodied in a machine tool of the type designed for both milling and boring operations and commonly known as a horizontal boring machine. It is to be understood, however, that the locking mechanism of my invention may be used in many other applications not limited to machine tools, but generally applicable wherever it is desired to effect locking and unlocking or automatic locking and unlocking of coacting elements of the character contemplated by this invention. In the case of a machine tool as here shown the coacting elements are a spindle 12 and a cutting tool. In general the tool locking mechanism includes a draw bar 13 shaped to be threaded into and out of engagement with a threaded recess 14 of a shank 16 of a tool 17, power means for effecting rotation of the draw bar, and means responsive to the speed of rotation of the power means to cause rotation of the draw bar to effect a threaded connection between the draw bar and the tool in one direction of rotation of the draw bar and to disconnect the draw bar and the tool in the opposite direction of rotation of the draw bar.

As abovementioned, my invention in the preferred embodiment contemplates the use of tapers having a degree of angularity considerably higher than the so called Morse taper. The Morse taper is a standard of approximately .6246" taper per foot. In actual practice I prefer a standard of approximately 3.5" taper per foot, which is about 16° as compared with the Morse taper of about 3°. However, it should be understood that my invention is not limited to this taper but contemplates in the broader aspects any of a wide range of tapers.

As best seen in Figure 1 the machine comprises a base 18, a saddle 19 mounted on the base for reciprocation lengthwise of the base 18 and a work table or platen 21 mounted on the saddle 19 for reciprocation in a direction transversely of the base 18. On one side of the base 18 is an upright column 22 supporting a spindle head 23. The latter supports the spindle 12. A motor 24 having suitable controls accessible to the operator of a machine is mounted on the spindle head 23 and furnishes driving power for the spindle. Suitable power means and controls are also provided for controlling the movements of the saddle 19, the platen 21, the spindle head 23.

The spindle 12 comprises an elongated generally cylindrical body having an axially extending passageway 27 extending therethrough. At one end of the spindle the passageway 27 is flared to define a socket 26 for receiving the tapered shank 16 of the tool 17. Concentrically arranged with the tool socket 26 are axially extending lugs 28 shaped to interfit in slots formed on a collar 29 on the shank 16 of the tool 17. Preferably the lugs 28 fit snugly in the slots on the collar when the tool is seated so that the lugs 28 engage the side walls of the slot to prevent rotation of the tool relative to the spindle 12. When the tool 17 is seated the collar 29 is preferably spaced slightly from the outer axial face of the spindle 12 to assure a tight fit of the shank 16 in the socket 26. However, any suitable form of interlocking expedient may be used in lieu of the lugs 28 and the coacting slots. The outside diameter of the threaded portion of the tool shank 16 is slightly smaller than the diameter of the passageway 27 to further assure a tight fit of the tapered portion of the shank in the socket 26.

The spindle 12 in this instance is mounted for rotation and axial movement. The forward end of the spindle is supported in a conventional manner and for purposes of simplifying the drawings the details of this support have been omitted since they form no part of the present invention. The rear end of the spindle 12 is supported by ball bearings 31 journaled in a housing 32 forming a part of a slide 33 (see Figures 3 and 6). In this instance two ball bearings 31 are provided for journaling the rear end of the spindle. The bearings are disposed between a shoulder 34 formed on a collar 36, mounted on the spindle, and a spacer 37 mounted on the opposite end of the collar 36. A nut 38 screwed on the end of the collar 36, opposite to that on which the shoulder 34 is formed, engages the spacer 37 and maintains the inner race of the bearings 31 and the collar in tightly assembled relation. This construction also holds the bearings against axial movement relative to the collar 36. The outer race of each bearing 31 is received in a recess formed in an end wall 39 of the housing 32. The outer races of the bearings are retained between a shoulder 41 formed in the end wall 39 and a retainer 42 secured against the end wall by suitable means such as screws. An oil seal 43 is supported in the retainer 42 and acts against the collar 36 to prevent leakage of lubricant from the housing 32. The collar 36 is supported on the rear end of the spindle 12 which is of reduced size to form a shoulder 44. One axial face of the collar 36 abuts against the shoulder 44 and the opposite end of the collar is engaged by a nut 46 threaded on the reduced end portion of the spindle 12.

The slide 33 (see Figure 6) is formed with laterally extending arms 47 shaped to be supported on gib plates 48 detachably secured to the bottom edge of the side walls 49 forming a part of the spindle housing 23. The plates 48 are disposed in a horizontal plane and in effect define ways upon which the arms 47 of the slide are free to reciprocate. Suitable lubrication passageways 51 are provided in the arms to effect lubrication between the arms 47 and the plates 48. On its top the slide is formed with a split collar 52 shaped to support the components of a lead screw nut assembly 53 for receiving a lead screw 54. The lead screw nut assembly 53 may be of any conventional construction and forms no part of the present invention. The lead screw 54 is suitably mounted in the spindle head 23 in a conventional manner. Suffice it to say the above construction is such that upon rotation of the lead screw 54 the slide 33 and spindle 12 move lengthwise of the spindle head 23, the direction of movement depending upon the direction preselected by the operator of the machine. A conventional clamping screw 50 engageable with one of the plates 48 may be provided for locking the slide in a desired adjusted position.

The draw bar 13 (see Figures 2 and 3) in this instance is an elongated shaft extending lengthwise of the passageway 27 in the spindle 12. At its forward end the draw bar is journaled in a bushing 56 suitably supported in the passageway 27 adjacent the tool socket. The extreme forward end of the draw bar 13 is shaped to be threadably received in the threaded recess 14 in the shank 16 of the tool 17. While a thread connection between the draw bar and the tool shank is preferred, my invention contemplates any equivalent or suitable means whereby connection will be established between the draw bar and the tool shank by power operation of the draw bar. At its rear end the draw bar is formed with a collar 57 disposed in an enlarged portion 55 of the passageway 27 at the rear end of the spindle 12. A suitable thrust bearing 58 is disposed between the collar 57 and a shoulder 59 formed in the passageway 27. A spring 61 acting between the collar 57 and a sleeve 62, the purpose of which will presently appear, normally urges the draw bar in a forward direction so that the collar 57 abuts against the thrust bearing 58 and the threaded end of the draw bar is in the position it normally assumes when a tool 17 is locked in the spindle as shown in Figure 3. The enlarged portion 55 of the passageway 27 is of sufficient length so that the collar 57 may be moved axially when pressure is applied to the forward end of the draw bar to a position such that the slots in the collar 29 of the collar 17 may receive the axially extending lugs 28 on the spindle 12.

Mounted at the rear end of the draw bar 13 is a clutch mechanism. The latter includes a driving member and a driven member. The driven member is formed in part by the sleeve 62. The latter is received in a bushing 66 supported in the spindle at the extreme rear end of the enlarged portion 55 of the passageway 27. The sleeve 62 is connected to the extreme rear end of the draw bar 13 through a splined connection. At its outer end the sleeve is formed with an annular flange 67 having one axial face shaped to abut against a thrust bearing 68 abutting against the rear axial face of the spindle 12. A retainer 69 engageable with the periphery of the flange 67 and the opposite axial face thereof secures the driven member in assembled relation with the spindle. The driving member herein is also in the form of a sleeve 71 in axial alinement with the sleeve 62 and mounted on a shaft 72. The shaft is suitably supported by bearings 73 and 74 retained, respectively, in suitable recesses formed in a partition 76 and a rear end wall 77 of the housing 32. The sleeve 71 is mounted on the shaft 72 through a splined connection to permit axial movement of the sleeve relative to the shaft but at the same time preventing relative rotational movement of the sleeve with respect to the shaft. On its end adjacent the sleeve 72 the sleeve 71 is formed with an annular flange 78. Teeth are formed respectively on the adjacent axial faces of the flanges 67 and 78. In this instance three annularly spaced teeth 81 are formed on the flange 67 and three annularly spaced teeth 82 shaped to mate with the teeth 81 respectively are formed on the flange 78. The shape of the teeth is best shown in Figure 8. As shown therein the left hand side of each tooth 82 is inclined at a greater angle (measured from a plane perpendicular to the face of the flange 78) than the right hand side of each tooth 82. Similarly the left hand side of each tooth 81 is inclined less than the right hand side of each tooth 81. The teeth 81 and 82 are spaced so that there may be a slight relative rotational movement between the teeth before engagement is effected.

When it is desired to thread the draw bar 13 into the threaded recess 14 of a tool the driving member is rotated in a direction to cause the sides of the teeth 81 which are inclined the greatest to engage the corresponding sides of the teeth 82. When it is desired to unthread the draw bar 13 the driving member is rotated in a direction to cause the sides of the teeth 81 which are inclined the least to engage the corresponding sides of the teeth 82. With the above construction the teeth of the driving member will be cammed relative to the teeth of the driven member should there be any slippage between the members when the draw bar is threaded into the recess 14 of a tool. When the driving member rotates in a counterclockwise direction of rotation such as when it is desired to unlock the tool, the less inclined sides of the teeth 81 engage the corresponding sides of the teeth 82. Due to this construction an impact blow can be effected between the driving member and driven member when it is desired to unlock the tool. The impact blow facilitates removal of the draw bar 13 from the threaded recess 14 in the tool 17 in the event there should be a tendency of sticking between the parts. The driving member is normally in a position in which it is spaced from the driven member. To this end the shaft 72 has an axially extending passageway 83. Disposed in the axially extending passageway 83 is an elongated rod 84. At one end the rod 84 extends through a washer 85, received in an axially facing recess 86 formed in the axial face of the sleeve 71, to receive a nut 87. A spring 88 acts between an enlarged end 89 on the rod 84 and the shaft 72 to urge the driving member to the position in which the teeth 81 are out of engagement with the teeth 82 or in other words the driving member is normally urged to its disengaged position as shown in Figure 3.

Movement of the driving member to a position in which the teeth 81 engage the teeth 82 or its engaged position is under the control of a speed responsive or governor means. The speed responsive means as best shown in Figures 3 and 5 includes a pair of members 91 and 92, one of which is movable axially relative to the other a preselected distance in response to a preselected speed of rotation of the members to effect engagement of the teeth 81 and 82. The member 91 is generally in the form of a disc having a sleeve portion 95 rotatably mounted on a bushing 93 in turn rotatably mounted on the sleeve 71. At one end the member 91 is formed with gear teeth 94 for connection to the power means as described hereinafter. The gear 94 abuts against a spacer 90 mounted on the shaft 72 and in turn abutting against the inner race of the ball bearing 73. On the opposite end of the member 91 its axial face is formed with a plurality of annularly spaced radially extending recesses 96 shaped to receive spherical balls 97. The recesses are of such depth that a portion of each of the balls projects beyond the axial face of the member 91. The recesses are also shaped to form guideways for the balls as they move radially in response to speed changes of the member 91. The member 92 includes a sleeve portion 105 mounted on the bushing 93. One axial face of the sleeve 105 is formed with diametrically opposed recesses 98 shaped to receive axially extending tongues 99 on the sleeve portion 95 of the member 91. The sleeve portion 105 and the sleeve portion 95 are of substantially the same diameter so that these parts serve to define the inner radial position of the balls or the position they assume when the member 91 is stopped or rotating at a relatively low speed. With the tongues 99 received in the slots 98 the members 91 and 92 are interlocked together and rotate as a unit. Intermediate the ends of the sleeve portion 105 is a radially extending flange 101. The latter at a position spaced outwardly from the sleeve portion is inclined at an angle toward the member 91 to define an inclined surface 100 engageable with the sides of the balls 97 projecting beyond the recesses when the members 91 and 92 are in closely spaced side by side relation as shown in Figure 4. At its extreme outer end the flange 101 terminates in a rim 103 concentric with the sleeve portion 105 of the member 92 and spaced outwardly therefrom. The rim serves to limit outward movement of the balls. A thrust washer 102 is disposed between the flange 78 on the sleeve 71 and the member 92 to permit relative rotation of the respective parts.

A motor 104 forms the power means in this embodiment of the invention, but any suitable prime mover may be used as the power means. As shown in Figure 3 the motor is attached to the rear end wall 77 of the housing 32 and has its shaft 106 extend inwardly thereof. Mounted on the shaft is a gear 107 (see Figure 6) shaped to mesh with an idler gear 108 (see Figures 3 and 6) rotatably mounted on a horizontal shaft 109 at one side of the motor shaft 106. The shaft 109 is suitably supported by the end wall 77 and the partition 76. The gear 108 is directly connected with an idler spur gear 110 rotatably mounted on the shaft 109 and shaped to mesh with a spur gear 111 mounted on the shaft 72 between the partition 76 and the end walls 77. A spacer 115 is disposed between the gear 111 and the inner race of the ball bearing 73. The motor and the gear mechanism form a power train which effects rotation of the shaft 72. Mounted on the extreme end of the motor shaft 106 in the housing 32 is a gear 112 retained thereon by a nut 113. The gear 112 is shaped to mesh with the gear 94 to rotate the members 91 and 92 forming the speed responsive means. In general the gear train between the motor shaft 106 and the shaft 72 is such as to rotate the driven member and teeth 81 at a relatively low speed. The gear train between the speed responsive means and the motor shaft 106 on the other hand is such as to permit the speed responsive means to rotate at a relatively high speed.

The motor 104 is a reversible motor and may be of any conventional construction. Any suitable power means may be used for energizing the motor. Since the circuit is a standard circuit for a reversible motor the details of the circuit have been omitted and only the push buttons 122 and 123, which may be marked "Forward" and "Reverse" respectively connected in the circuit, are shown. The push buttons are mounted on the spindle head 23 in a position to be accessible to the operator of the machine.

Provision is made for preventing the rotation of the spindle 12 while the teeth 81 and 82 are in an engaged position. This is accomplished in this instance by means of an interlocking normally open switch 116 disposed in the circuit (not shown) to the spindle motor 24. The switch 116 is mounted in the housing of the motor 104 by means of a bracket 117 attached to an end wall 118 of the housing of the motor. A plunger 119 of the switch is arranged to be engaged by a push rod 121 supported to extend axially of the head 89 of the rod 84. The switch 116 is arranged so that when the rod 84 is in its retracted position such as shown in Figure 3 the switch 116 is closed and the circuit to the motor 24 may be closed. When the teeth 81 and 82 are engaged, such as shown in Figure 4, the push rod 121 moves axially with the rod 84 and actuates the switch to interrupt the circuit to the motor 24. To prevent leakage of oil from the housing 32 the push rod 83 extends through a suitable lubricant seal supported in the end wall 118 of the motor housing.

The operation of the aforegoing mechanism is as follows: It is assumed that the spindle 12 is in the position shown in Figure 1 and not rotating and that the parts of the tool lock mechanism are in the position shown in Figure 2 in which the teeth 81 are out of engagement with the teeth 82. The draw bar 13 is urged to its forward position by the spring 61. The rod 84 maintaining the teeth 81 out of engagement with the teeth 82 is urging the push rod 121 to depress the plunger 119 of the switch 116 to close the circuit to the spindle motor 24. To lock a cutting tool 17 in the spindle the operator of the machine tool places the tool 17 so that the shank 16 is received in the tool socket 25. The end of the shank will engage the end of the draw bar 13. With the parts in this position the shank 16 will not be completely seated in the tool sockets. The operator therefore applies an axial pressure against the end of the draw bar 13 (to the right viewing Figure 2) and through application of this force on the tool 17 compresses the spring 61, the compression face of which spring then acts between the collar 57 and the sleeve 62 to urge the draw bar forwardly (to the left viewing Figure 2). The tool is further moved by hand of the operator to the right axially relative to the spindle until the lugs 28 are received in the slots formed in the collar 29. While so holding the tool with one hand the operator with his other hand presses the "Forward" push button 122 to cause the motor 104 to operate in a direction such that the teeth 82 rotate in a clockwise direction of rotation, viewing Figure 7. However, at this instant the teeth 81 and 82 are not engaged but will almost instantly be engaged by the action of the speed responsive unit, as will now be described. Simultaneously with this operation of the teeth 82 the speed responsive unit is driven by the motor through the gears 112 and 94. This causes the members 91 and 92, which are interlocked together through the tongue and slot connection, to rotate. As the speed of the motor shaft 106 increases the members 91 and 92 rotate more rapidly. As the speed of rotation increases the balls 97 tend to move radially outwardly by centrifgual force. When the balls move radially outwardly they engage the inclined surface 100 and force the member 92 axially (to the left, viewing Figure 3) away from the member 91 by a wedging or camming action. When the members 91 and 92 reach a preselected speed, in this instance the speed effected approximately when the motor reaches its maximum speed, sufficient centrifugal force is exerted by the balls 97 so that the member 92 is urged axially to the left by the camming action to a position where the teeth 82 engage the teeth 81 in driving engagement therewith (see Figure 4). In so doing the member 92 abuts against the thrust washer 102 and the sleeve 71 is moved axially to the left relative to the spline portion of the shaft 72. Simultaneously the spring 88 is compressed (by the described axial movement of the sleeve 71 acting through the washer 85 and the rod 84) and the push rod 121 moves to the left out of engagement with the plunger 119 of the switch 116 so that the switch moves to its normally open position to interrupt the circuit to the spindle motor 24. This interruption of the circuit for the motor 24 is for the purpose of preventing operation of the motor 24 and consequently the spindle 12 until completion of the tool locking cycle. In other words, this is a safety interlock prior to operation of the spindle motor. When the teeth 82 engage the teeth 81 the sleeve 62 rotates and in turn effect rotation of the draw bar 13 through the splined connection therebetween. This rotation of the draw bar is at a relatively slow speed because drive is through the gear train 107, 108, 110, 111, to shaft 72 and the teeth 82—81. This rotation of the draw bar screws the draw bar threads 13' into the threaded recess 14 formed in the shank of the tool 17. While the draw bar 13 is rotated the spring 61 which was compressed upon the insertion of the tool 17 in the tool socket acts to urge the draw bar 13 in the direction of the tool 17 to assure a good initial contact between the draw bar and the tool 17 to thereby assume engagement of the threads. The position of these parts is best shown in Figure 2. Inasmuch as the circuit for the spindle motor 24 is interrupted by the switch 116 as above described, the spindle 12 cannot be accidentally started to turn the tool in the operator's hands. At this stage the operator is holding the tool with one hand as shown in Figure 2, and with the other hand he is pressing the push button 122 to operate the motor. Now, as the power drive draw bar 13 threads into the threaded socket 14 of the tool 17, the tool will be drawn by this power action into the socket 25 of the spindle and seated therein. This seating action is a distinctive feature of the invention. One of the advantages is in the fact that the seating is effected automatically and uniformly as to the degree of force applied in moving the tool to its fully seated or home position. In this tool seating operation the draw bar and its driving parts come to a dead stop when the tool is fully seated, thereby stalling the motor 104. At this point the operator can tell by feel or by the change in the sound of the motor 104 when the tool is completely seated in the socket. When the operator is assured that the tool is so seated he removes his hand from the push button 122 and the current to the motor 104 is shut off. Prior to the time the operator takes his finger off the push button 122, the draw bar driving mechanism and the speed responsive mechanism have ceased to rotate by reason of the fact that the motor has been stalled. However, the torque through the draw bar driving mechanism exerts a frictional force on the clutch teeth 82—81 sufficient to maintain their engagement. This condition prevails for the period until the operator has sensed the final tool seating and released the push button 122. Now, with the motor torque removed the draw bar driving parts are free to restore or return to the normal disengaged position shown in Figure 3. The machine tool is then ready for operation and may be used in the ordinary manner.

When it is desired to unlock and remove the tool 17 from the spindle 12 the operator presses the push button 123 to cause the motor shaft 106 to rotate in a counterclockwise direction of rotation. The shaft 72 in this instance is caused to rotate in the direction of rotation, opposite to that described in the locking cycle, through the gears 107, 108, 110 and 111. With the shaft 72 rotating in this manner the less inclined sides of the teeth 82 engage the less inclined sides of the teeth 81, as shown in Figures 7 and 8. In view of the fact that the sides of the teeth in engagement under these conditions are relatively straight the full power of the motor can be utilized in effecting unthreading of the draw bar 13 from the tool 17 without slippage between the teeth occurring. Also with this construction and due to the spacing of the teeth there is an impact effect when the teeth 82 first engage the teeth 81 which is beneficial in unthreading the draw bar 13 from the threaded recess 14 in the tool 17. When the motor shaft 106 rotates at the preselected speed, the balls 97 are thrown radially outwardly and in turn cause the sleeve 71 to move axially of the shaft 72 and teeth 82 engage the teeth 81 in the manner described hereinbefore. When the tool 17 and draw bar 13 are disconnected the operator releases the push button 123 and removes the tool 17.

One of the distinctive advantages of the invention is the short interval of time required for the automatic locking and unlocking of the tool. In actual practice with the embodiment herein disclosed the complete tool locking operation is effected in approximately 1.5 seconds. By employing a higher gear ratio in the draw bar drive mechanism this elapsed time may be reduced to less than a second. The automatic tool locking is, therefore, almost instantaneous. The unlocking time is substantially the same.

This locking mechanism insures that all tools 17 are held in the spindle with the same pressure. Moreover the applied pressure in each instance is a uniform pressure. This tool locking mechanism is automatic and the tool is mechanically locked in the spindle or unlocked in response to actuation of a control button. The operator need not utilize a hammer to pound the spindle to effect release of the tool as has been the case heretofore. In view of the fact that a hammer below is not required to loosen the tool the spindle is not subject to mutilation or damage as is the case with prior constructions. This fact also contributes to the accuracy of the machine because the continual pounding of the spindle to effect release of the tools causes the spindle to become misalined. Test experience also shows that the surface finish on articles machined by machine tools employing the present tool locking construction have a smoother finish than is the case with conventional spindles and locking means. This construction also eliminates the manual work involved heretofore associated with conventional means for securing a tool in the spindle.

While I have shown one embodiment of my invention it will be understood that I do not wish to be limited thereto since many modifications may be made, and I therefore contemplate by the claims to cover such modifications as fall within the true spirit and scope of my invention.

I claim:

1. An automatic tool lock comprising in combination with a tool having a tapered shank and a spindle having a tapered socket to receive the tool shank and a first electric motor for driving said spindle, a draw bar on the spindle having means operable by rotation of the draw bar to connect with the tool shank and seat it in the spindle socket, a second electric motor, and mechanism operated by said second motor for rotating the draw bar to effect said tool seating including a normally disengaged clutch and clutch actuating means operative after a predetermined time delay following energization of said second motor to permit said second motor to reach a predetermined speed before engaging said normally disengaged clutch.

2. In combination, a drive spindle, a first prime mover means for driving said spindle, a tool, and mechanism for locking the tool in driving connection with the spindle including a draw bar for threading into the tool to hold it in said driving connection, a second prime mover completely independent of said first prime mover means for driving said spindle, clutch means for establishing driving connection between said draw bar and said second prime mover, and delay means for rendering effective said clutch means for establishing driving connection between said second prime mover and said draw bar only after a given speed of said second prime mover has been attained.

3. In a tool locking mechanism, the combination of a tool, a spindle having a tool socket at one end, spindle driving means, a rotatable draw bar mounted in said spindle and threadably engageable with said tool, power means for rotating said draw bar in either direction of rotation, said power means being completely independent of said spindle driving means, a clutch mechanism between the power means and said draw bar operable to connect the power means to and disconnect it from said draw bar, said power means including a prime mover and a speed responsive means driven by said prime mover, said speed responsive means operating to cause engagement of said clutch mechanism when the speed of rotation of said speed responsive means exceeds a preselected value in one direction of rotation whereby to effect threaded disengagement of the draw bar and tool to release said tool from its position within the socket.

4. In a tool locking mechanism, the combination of a tool, a spindle having a tool socket at one end to receive said tool, a motor for driving said spindle, a rotatable draw bar threadably engageable with said tool, a prime mover separate from said motor for rotating said draw bar in either direction of rotation, and a clutch mechanism between the prime mover and the draw bar operable when the speed of rotation of said prime mover exceeds a preselected value in one direction of rotation to effect threaded engagement of the draw bar and tool to secure the tool in the socket and when the speed of rotation of said prime mover exceeds a preselected value in the opposite direction of rotation to unthread the draw bar from the tool to permit removal of the tool from the socket.

5. In a tool locking mechanism for use with a machine tool, the combination of a tool having a threaded recess in one end, a spindle having a socket at one end for receiving the threaded end of the tool, said spindle having an axially extending passageway in communication with said socket and an abutment shaped to interfit in a slot on a tool to prevent relative rotation between the tool and the spindle when the tool is seated in the socket, a rotatable draw bar extending lengthwise of the passageway and having a threaded end portion, said draw bar being movable axially between an extended position in which the end portion is adapted to be threadably engageable with the tool to secure the latter in the socket and a retracted position in which the end portion is out of threaded engagement with the tool and the abutment is receivable in the slot of the tool, power means for rotating said draw bar to effect threaded engagement of the draw bar with the tool, and spring means acting between said spindle and said draw bar normally urging said draw bar to its extended position and compressible upon insertion of a tool in the socket and application of force to the tool to permit the abutment to be received in the slot of the tool whereby to prevent relative rotation of the tool with respect to the spindle when the power means rotates said draw bar.

6. In a tool locking mechanism, the combination of a spindle having a socket for receiving a tool having a threaded recess, a rotatably mounted draw bar extending axially through said spindle and shaped to be threadably connected with said tool, a first sleeve rotatably supported by said spindle and connected with said draw bar to drive the latter, a drive shaft in axial alinement with said draw bar, means for driving said drive shaft, a second sleeve mounted on said drive shaft for rotation in unison therewith and movable axially relative thereto between a retracted and an extended position, said sleeves being in spaced relation when the second sleeve is in its retracted position, means for normally urging said second sleeve to its retracted position, means shaped to act between said sleeves to effect a driving connection therebetween when said second sleeve is in its extended position, a first member rotatably mounted on said second sleeve, a second axially movable member rotatably mounted on said second sleeve and interconnected with the first member to rotate in unison therewith, means acting between said second member and said second sleeve whereby movement of the second member moves the second sleeve, means for driving said first member at a preselected speed, and means operable to move said second member axially of said first member to move said second sleeve to its extended position when said first member is driven at said preselected speed.

7. In a tool locking mechanism, the combination of a driven member mounted for rotation, a driving member mounted for rotation and disposed in side by side relation with the driven member, means for driving one of the members, means acting between the members for connecting the members to rotate in unison and permitting axial movement of one member with respect to the other, one of said members having a surface inclining toward the other, and one of said members having radially extending grooves facing the other member and balls disposed in said grooves and movable radially of said members in said grooves when the speed of rotation of said members exceeds a preselected value, said balls in moving radially acting between said inclined surface on said one member and the other member to cam one of said members axially away from the other.

8. In a tool locking mechanism, the combination of a member having a sleeve portion for mounting the member for rotation and a plurality of radially extending annularly spaced grooves on one axial face, a second member having a second sleeve portion for mounting the second member for rotation, means for driving one of said members, means acting between the sleeve portions of said members for interconnecting the members for rotation in unison and permitting axial movement of one of the members with respect to the other, said second member having a flange intermediate its ends, said flange extending radially of the sleeve portion of the second member to a distance spaced from the sleeve portion and inclining toward the first member to define an inclined surface adjacent said recesses, said flange terminating at its extreme outer edge in a rim concentrically arranged with the sleeve portion of the second member, and a ball disposed in each of said recesses and movable between a position adjacent said sleeve portions to engagement with said rim upon rotation of said members at a preselected speed, said balls upon movement from said first position to the second position acting between the first member and the inclined surface to move the second member axially away from the first member.

9. In a tool locking mechanism, the combination of a rotatable spindle, spindle drive means for driving the spindle, a draw bar shaped to be threadably engageable with a tool supported in the spindle, power means including a shaft in axial alinement with the draw bar, a first sleeve mounted on one end of said draw bar having axially facing teeth, a second axially movable sleeve mounted on said shaft having axially facing teeth shaped to mate with the teeth on the first sleeve, means for normally positioning said teeth to be in spaced relation, speed responsive means driven by said power means operable at a preselected speed to move said second sleeve to have the teeth thereon drivingly engage the teeth on the first sleeve to effect rotation of the draw bar and in turn threaded engagement with the tool, and means for preventing operation of said spindle drive means when said teeth of the first sleeve engage the teeth on the second sleeve.

10. In a tool locking mechanism, the combination of a spindle having a socket for receiving a tool having a threaded recess, a rotatably mounted draw bar extending axially through said spindle and shaped to be threadably connected with said tool, a first sleeve rotatably supported by said spindle and connected with said draw bar to drive the latter, a drive shaft in axial alinement with said draw bar, means for driving said drive shaft, a second sleeve mounted on said drive shaft for rotation in unison therewith and movable between a retracted and an extended position, said sleeves being in spaced relation when the second sleeve is in its retracted position, means for normally urging said second sleeve to its retracted position, means shaped to act between said sleeves to effect a driving connection therebetween when said second sleeve is in said extended position, shoulder means rigid with said second sleeve and rotatable therewith, fixed shoulder means spaced from the rotatable shoulder means, a first member rotatably mounted on said second sleeve in abutting relation with said fixed shoulder means, a second axially movable member rotatably mounted on said second sleeve adjacent said rotatable shoulder means and interconnected with the first member to move in unison therewith, means for driving said first member at a preselected speed, and means operable to move said second member axially away from said first member to move said second sleeve to its extended position when said first member is driven at said preselected speed.

11. In a tool locking mechanism, the combination of a spindle, a draw bar shaped to be threadably engageable with a tool supported by the spindle, power means including a shaft in axial alinement with the draw bar, a first sleeve mounted on one end of said draw bar having axially facing teeth, a second sleeve mounted on said shaft for axial movement and having axially facing teeth shaped to mate with the teeth on the first sleeve, and means for normally positioning said teeth to be in spaced relation and speed responsive means driven by said power means operable when said power means operates at a preselected speed to move said second sleeve to have the teeth thereon drivingly engage the teeth on the first sleeve to effect rotation of the draw bar and in turn threaded engagement with the tool, the teeth having two sides and one of the sides of each tooth being inclined at a greater angle than the other side of the tooth whereby in one direction of rotation of the sleeves a hammerblow impact effect is obtained and in the opposite direction of rotation of the sleeves the teeth may move relative to each other when the load on the power means reaches a preselected value.

CHARLES B. DE VLIEG.

References Cited in the file of this patent

UNITED STATES PATENTS

| Number | Name | Date |
|---|---|---|
| 1,794,361 | Armitage et al. | Mar. 3, 1931 |
| 2,349,959 | Guetzkow | May 30, 1944 |
| 2,441,046 | Turrettini | May 4, 1948 |
| 2,501,421 | Stephan | Mar. 21, 1950 |
| 2,557,582 | Turrettini | June 19, 1951 |